June 11, 1963     E. L. ARNESON     3,093,265
ARTICLE CARRIER
Filed Feb. 25, 1960     7 Sheets-Sheet 1
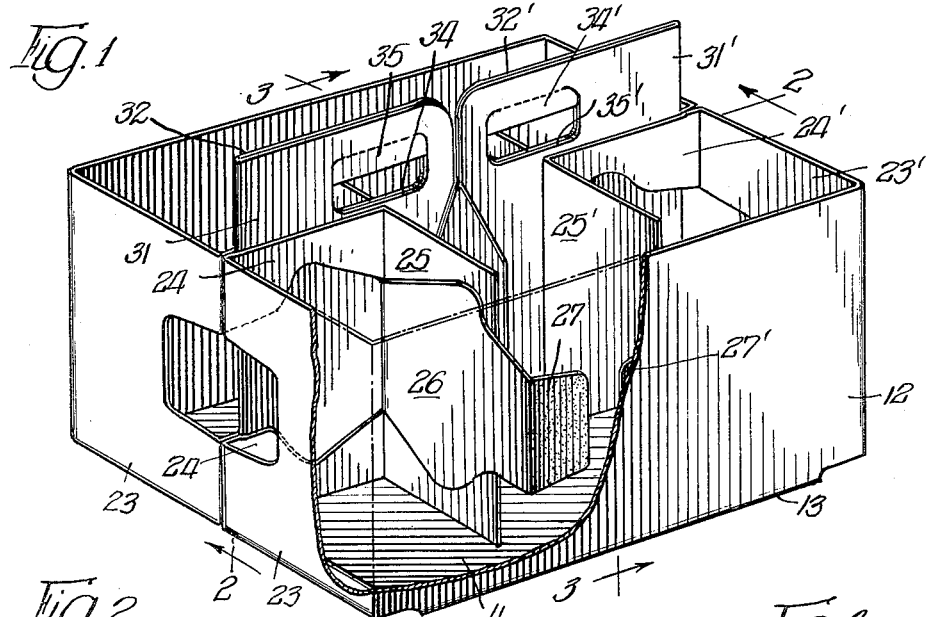
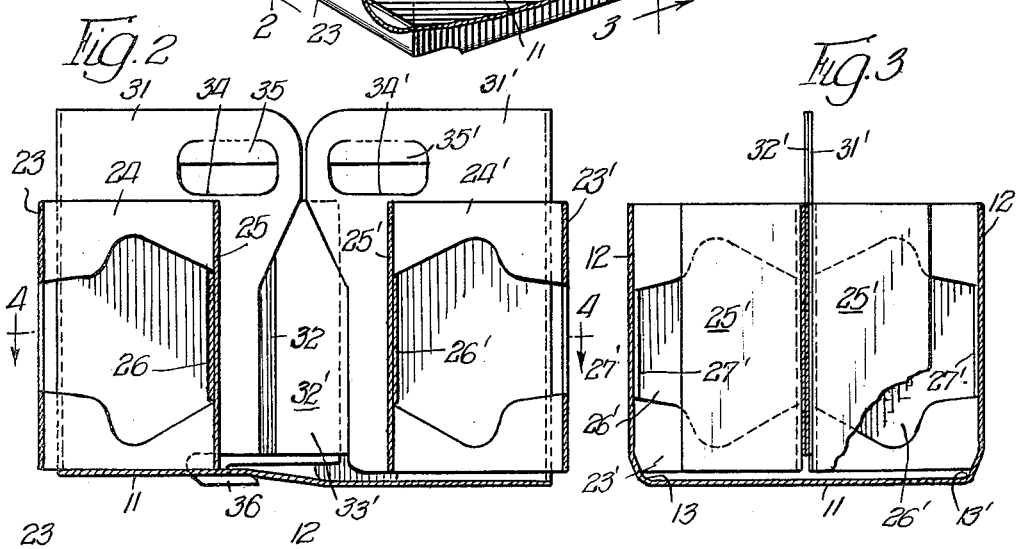
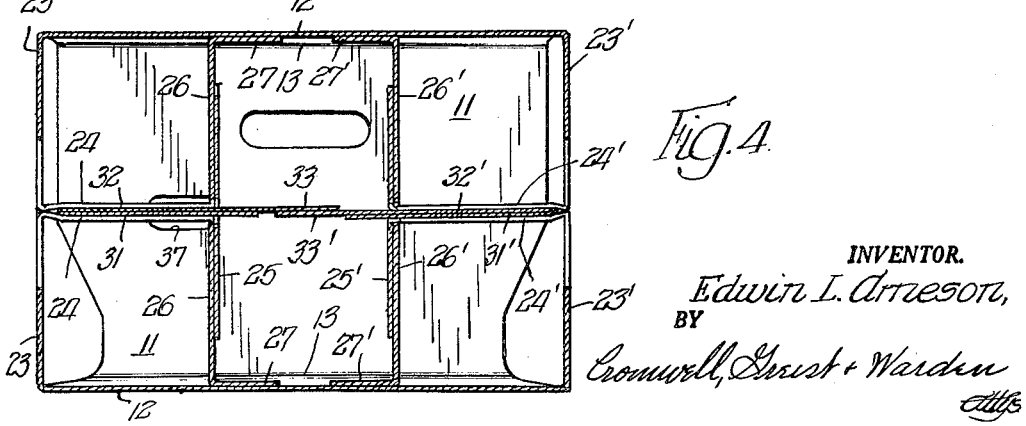
INVENTOR.
Edwin L. Arneson,
BY
Cromwell, Greist & Warden
Attys.

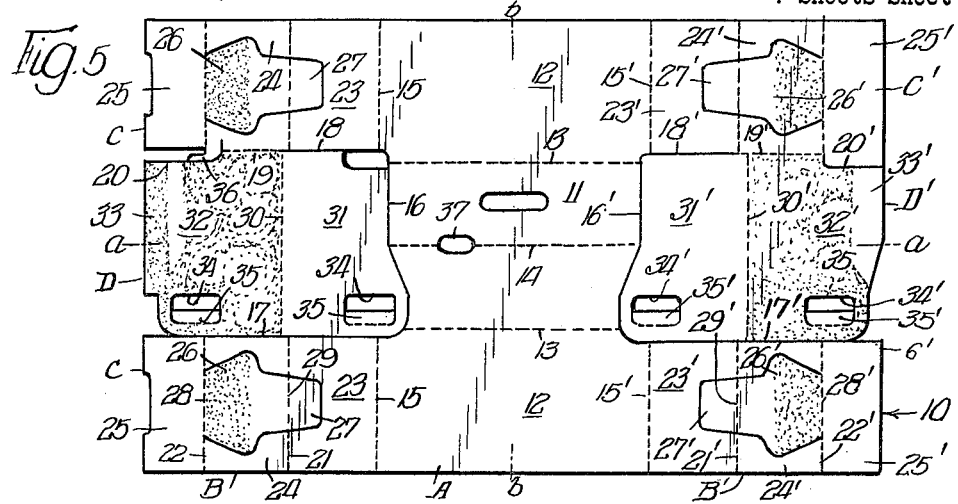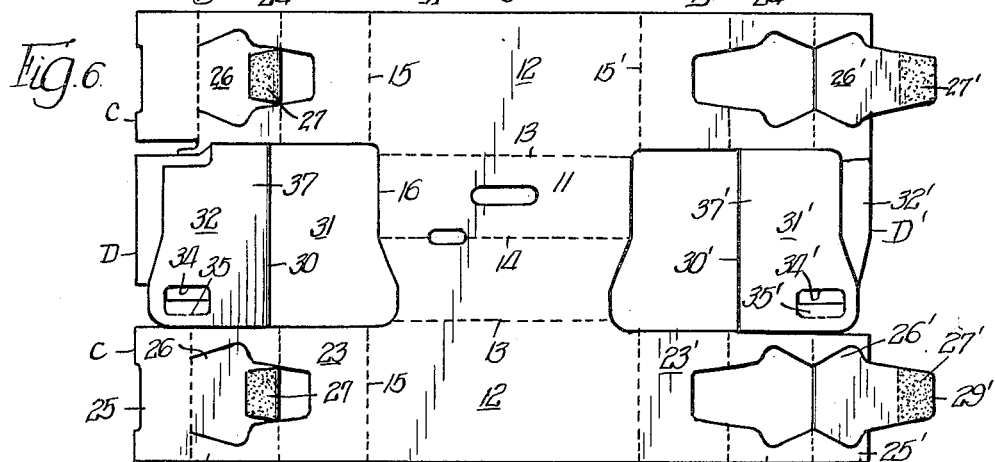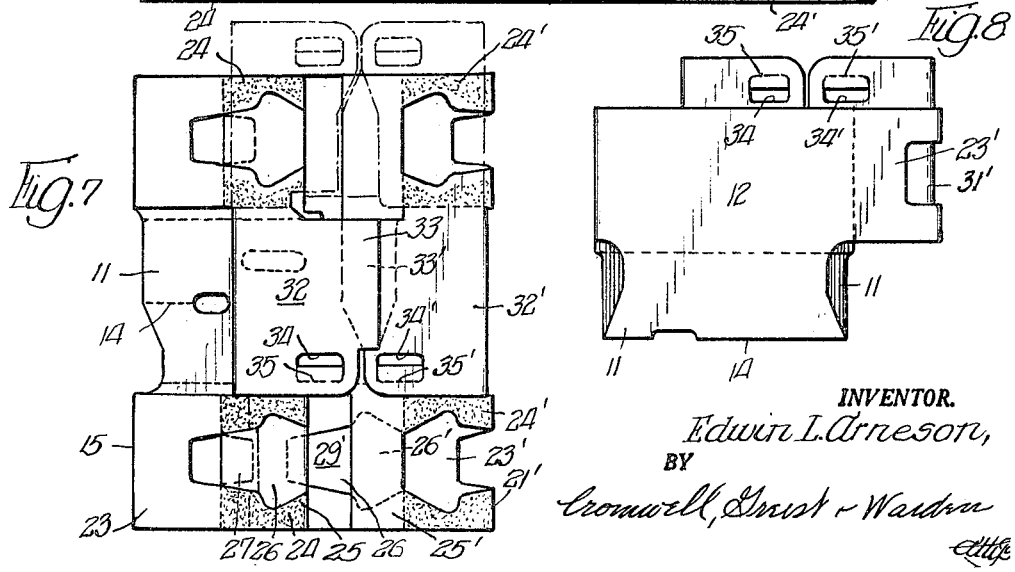

June 11, 1963   E. L. ARNESON   3,093,265
ARTICLE CARRIER
Filed Feb. 25, 1960   7 Sheets-Sheet 3
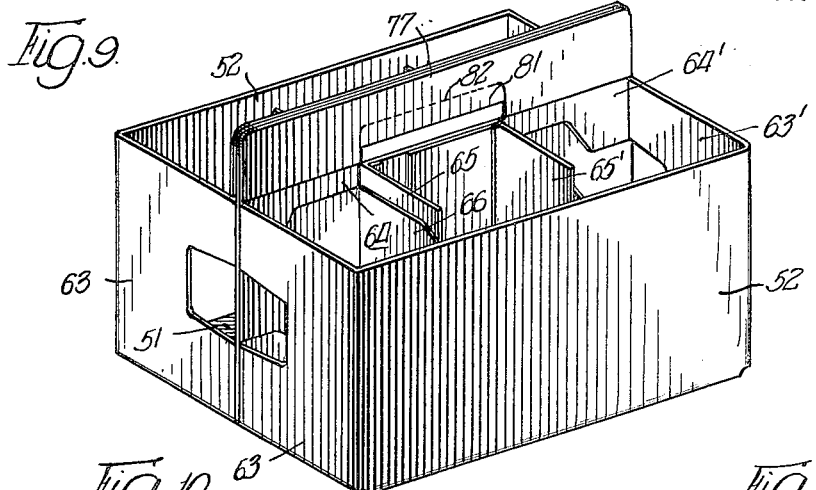
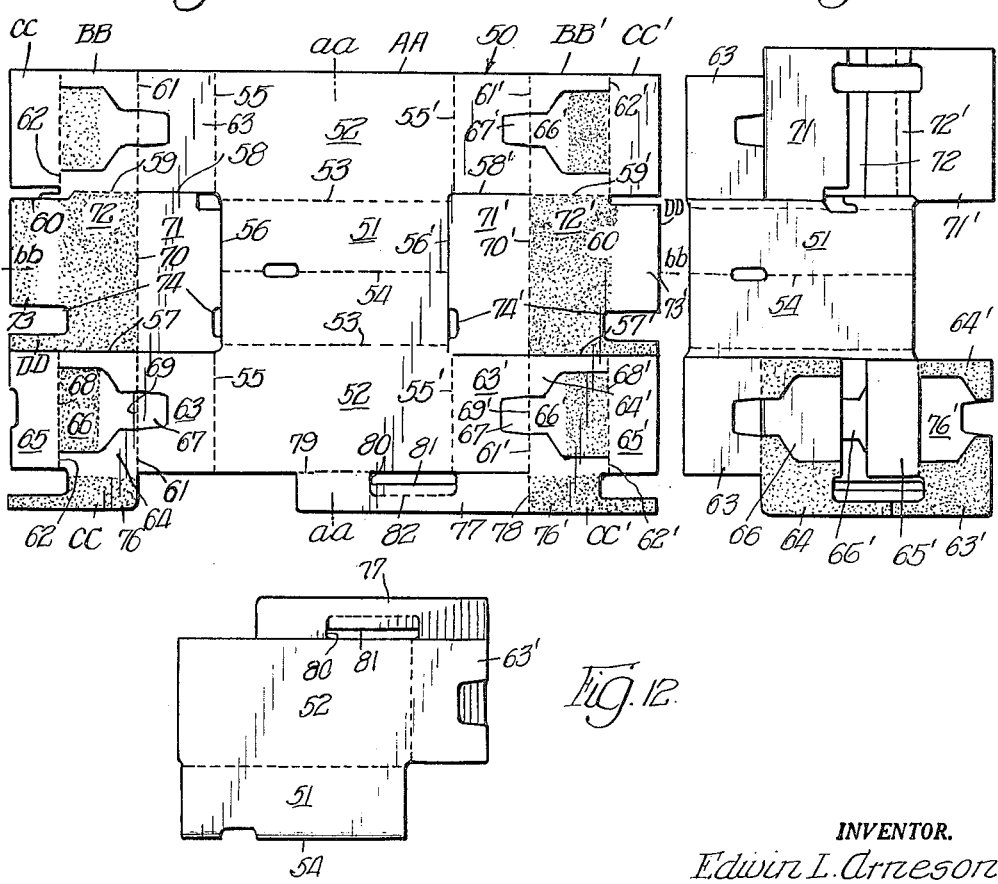
INVENTOR.
Edwin L. Arneson,
BY
Cromwell, Greist + Warden
Attys.

June 11, 1963  E. L. ARNESON  3,093,265
ARTICLE CARRIER
Filed Feb. 25, 1960  7 Sheets-Sheet 4
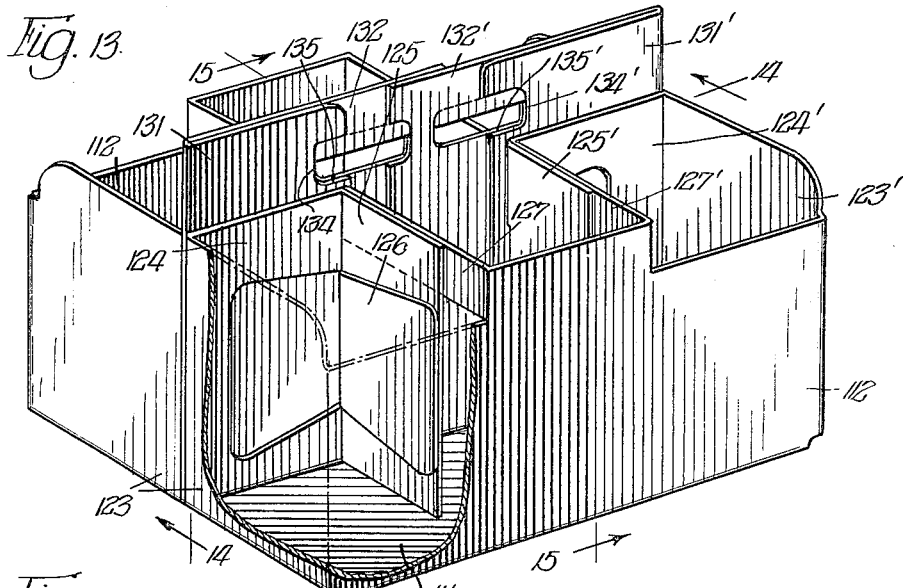
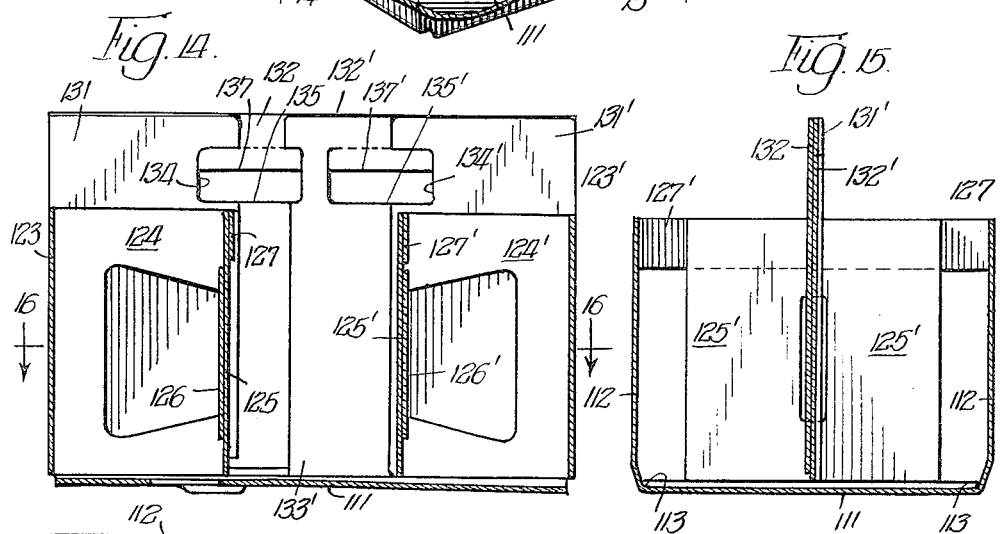
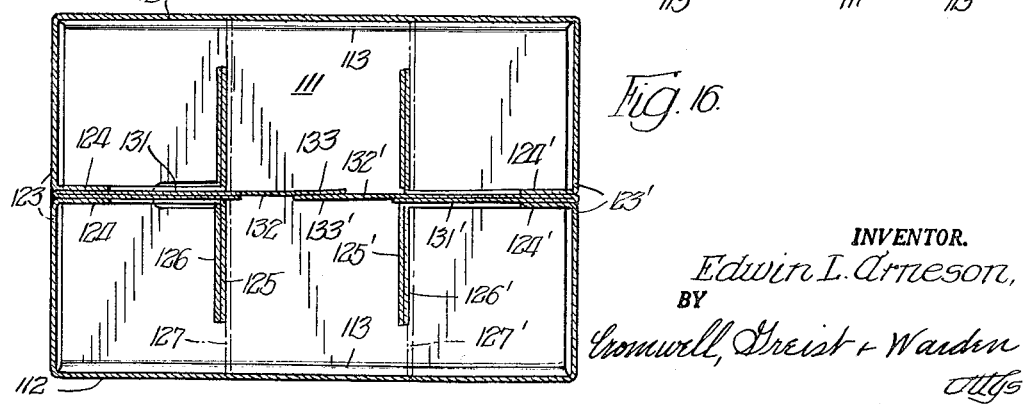
INVENTOR.
Edwin L. Arneson,
BY
Cromwell, Greist & Warden
Attys

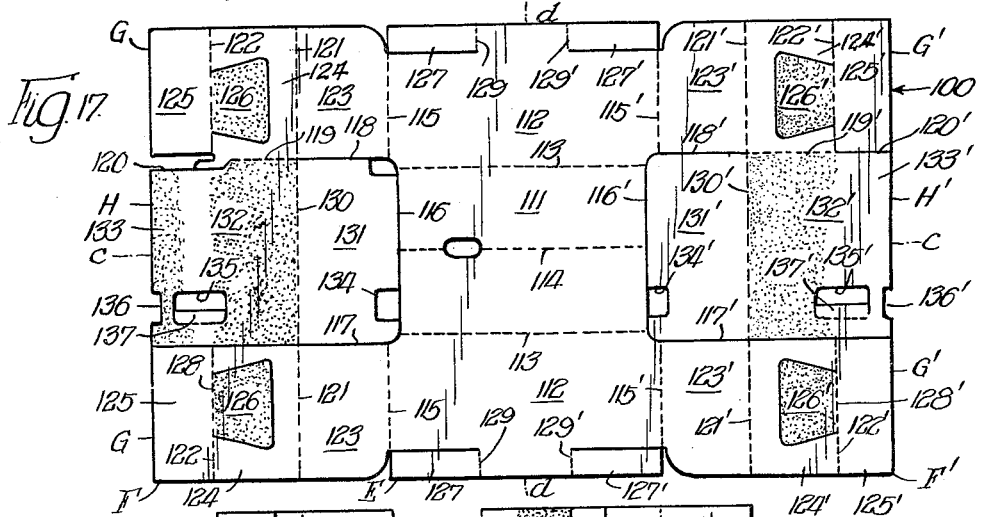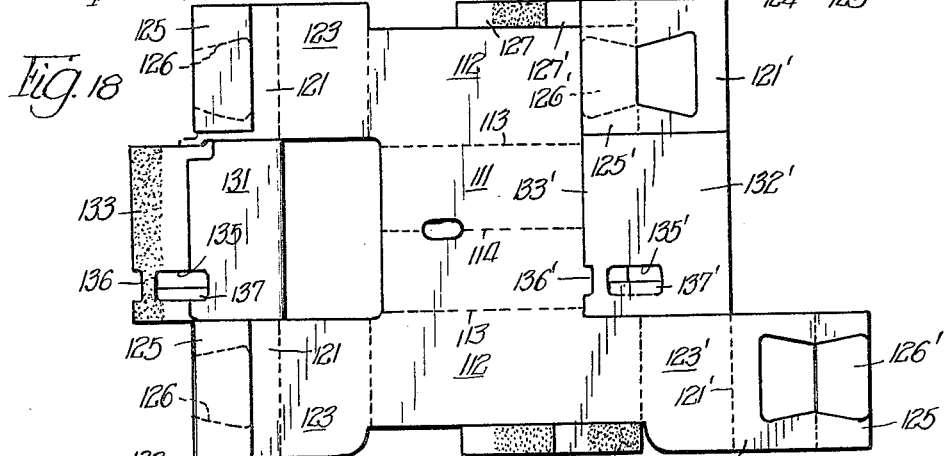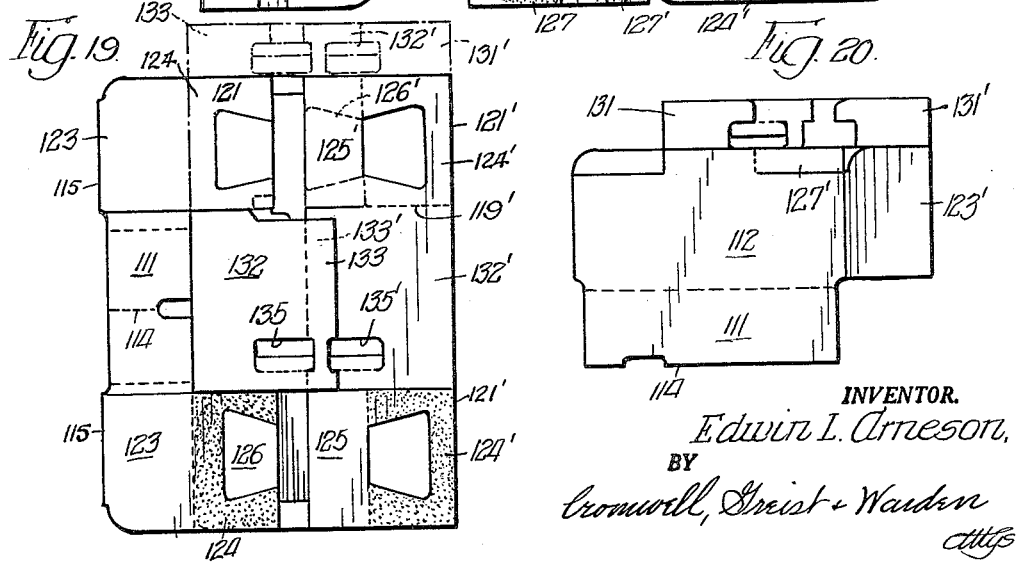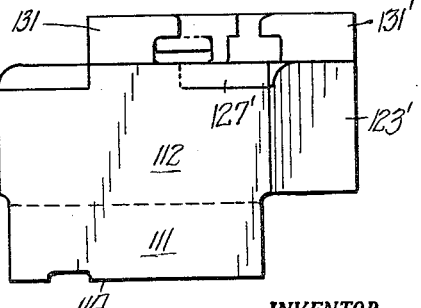

June 11, 1963 E. L. ARNESON 3,093,265
ARTICLE CARRIER
Filed Feb. 25, 1960 7 Sheets-Sheet 6
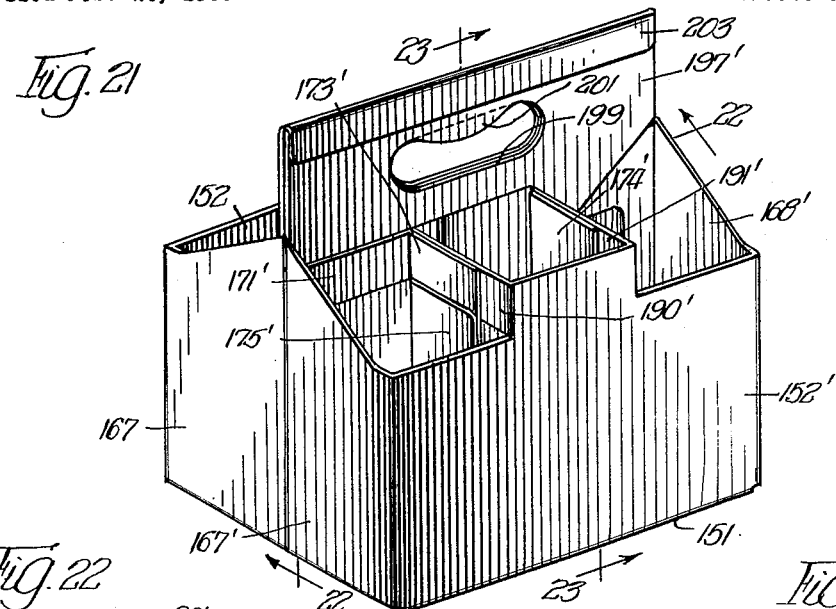
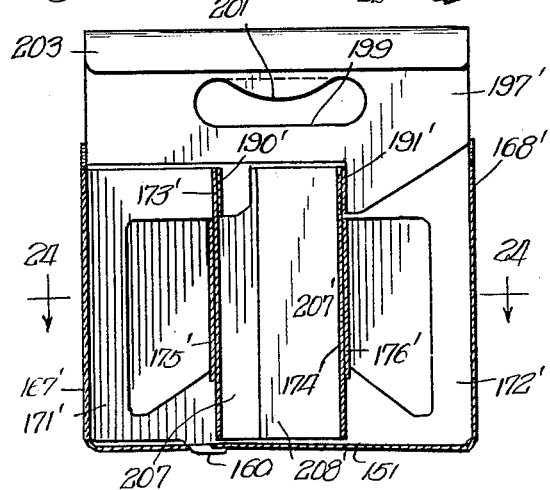
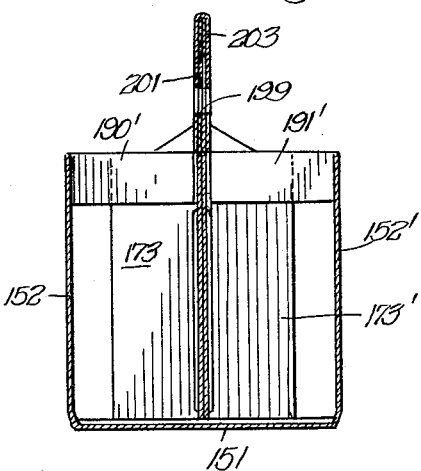
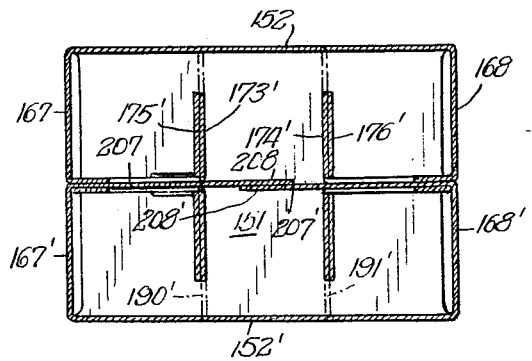
INVENTOR.
Edwin L. Arneson,
BY
Cromwell, Greist & Warden
Attys

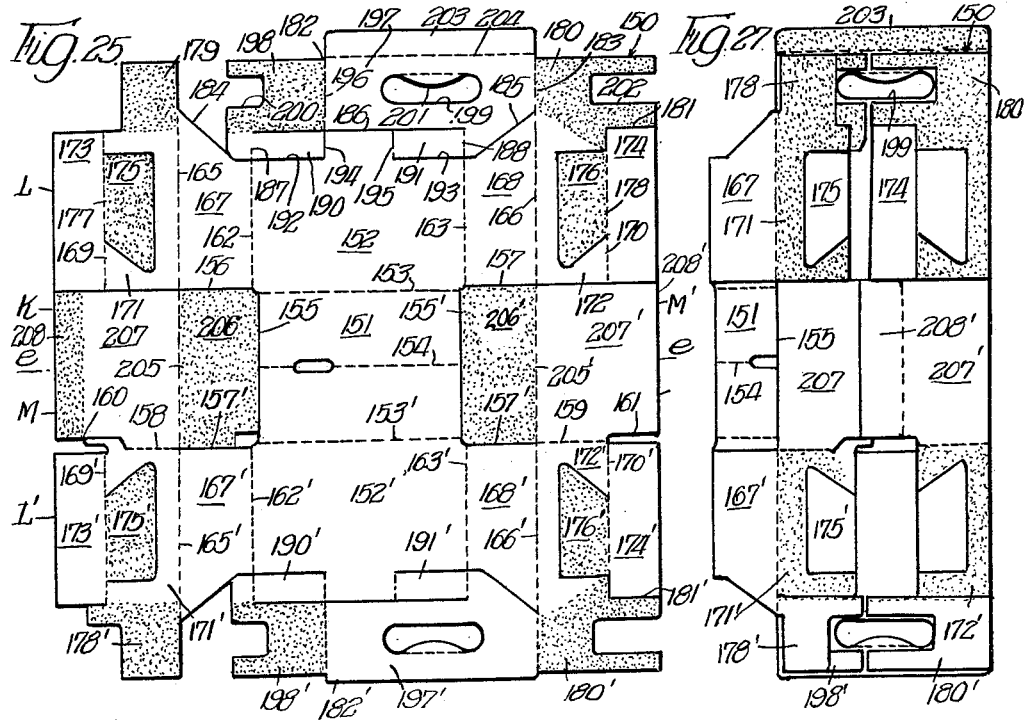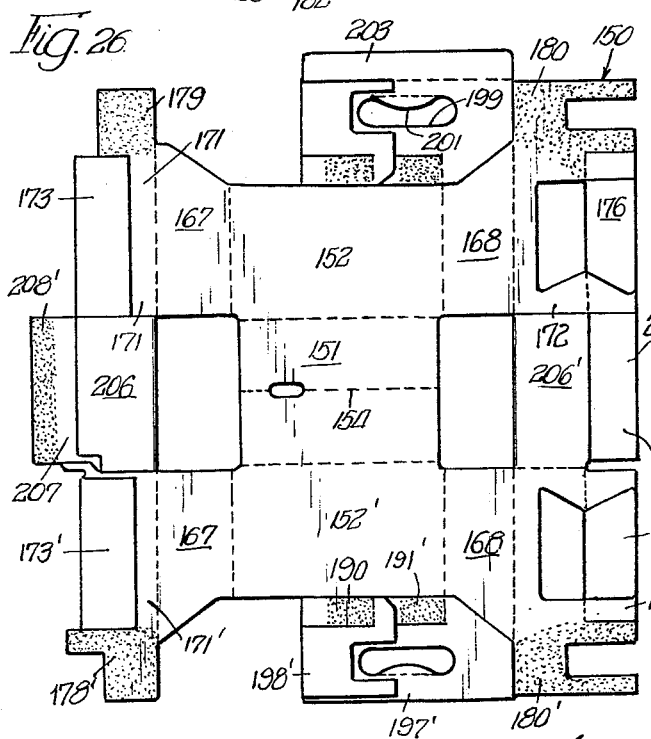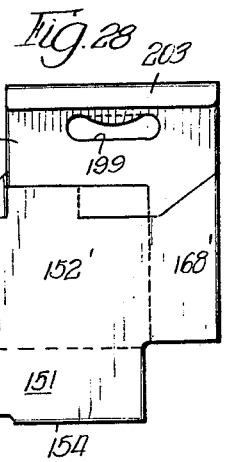

United States Patent Office 3,093,265
Patented June 11, 1963

3,093,265
ARTICLE CARRIER
Edwin L. Arneson, Morris, Ill., assignor to Federal Paper Board Company, Inc., Bergen, N.J., a corporation of New York
Filed Feb. 25, 1960, Ser. No. 10,971
1 Claim. (Cl. 220—113)

This invention relates to article carriers of the type which are fabricated from a single blank of flexible sheet material, with the blank being cut and creased to divide the same into a plurality of panels which are thereafter folded and secured in predetermined relation so as to provide, when in article receiving position, twin compartments separated by a longitudinally extending center partition and associated handle structure with each compartment divided into a multiplicity of article accommodating cells by cross partitions extending in longitudinally spaced relation between the center partition structure and the oppositely disposed side walls of the carrier.

Cellular carriers have heretofore been produced for use in connection with the marketing of bottled beverages such as soft drinks, beer and the like. Generally, such carriers have been provided for products which are sold in bottles designed to be returned to the bottling plant for refilling and reuse a number of times, and the carriers have been formed of relatively heavy paperboard stock in order to withstand the rough usage encountered upon repeated trips between the bottling plant and the product user. The use of relatively heavy paperboard stock and the employment of certain structural features which have been considered necessary to obtain a sufficiently rugged construction has kept the cost of such carriers relatively high. With the introduction of single trip or disposable glass bottles in the beverage industry, a demand has been created for a more economical paperboard carrier, that is, one which is sufficiently rugged for single trip use between the bottling plant and the purchaser of the beverages and which is not too costly so that it can be discarded along with the empty bottles after its first use. Carriers have been designed for this purpose which employ a paperboard blank of much lighter weight material than heretofore used, for example, .020 stock, as compared with the .040 stock commonly used, so as to substantially reduce the cost of the carriers and make it practical from an economical standpoint to employ them with the single trip bottles. Such lightweight board carriers have been used to some extent for certain bottled beverages, but they have not been acceptable for use in the marketing of beer in the single trip bottles, particularly, where the beer is transported by the railroads. The packaging rules enforced in rail transportation of bottled beer packaged in paperboard carriers provide for a minimum of thickness of .040 inch of paperboard material between the bottles in the carrier. Where the carrier is formed of lightweight board, that is, .020 stock, with a single thickness of material between the bottles, the minimum thickness requirement is not met and the carrier cannot be used for rail transportation.

It is a general object of the present invention, therefore, to provide an improved article carrier which is fabricated from a single sheet or blank of relatively lightweight, flexible paperboard material wherein the blank is cut and folded so as to provide in the erected carrier a double thickness of material between the articles in adjoining cells.

It is a more specific object of the invention to provide an improved paperboard article carrier fabricated from a paperboard blank of a minimum size which is slitted, creased and folded to provide opposed side walls, a longitudinal partition and handle structure paralleling the side walls, and cross partition members which are taken at least in part from the longitudinal partition structure and which extend between the latter and the side walls when the carrier is in erected condition with the cross partitions providing a double thickness of material between the cells and the longitudinal partition structure having portions in the areas between the cells on opposite sides thereof which afford a double thickness of material for separating the articles.

It is a further object of the invention to provide a twin compartment multi-cellular bottle carrier formed from a rectangular sheet of paperboard of relatively lightweight, for example, .020 thickness, which is cut and scored to provide a bottom wall forming panel, side wall panels hinged to opposite side edges thereof, pairs of end wall and longitudinal partition panels hinged to the opposite ends of the respective side walls, longitudinal partition and handle forming panels which are cut from the material between the end wall and longitudinal partition panels at each end of the blank and cross partition forming panel elements which are cut at least in part from the longitudinal partition panels adjacent the end wall forming panels.

These and other objects and advantages of the invention will be apparent from a consideration of the several embodiments of the article carrier which are shown by way of illustration in the accompanying drawings wherein:

FIGURE 1 is a perspective view of an article carrier having embodied therein the principal features of the invention, the carrier being shown in set-up empty condition and with portions of a side wall and an adjoining end wall thereof broken away;

FIGURE 2 is a longitudinal vertical section taken on the line 2—2 of FIGURE 1;

FIGURE 3 is a transverse section taken on the line 3—3 of FIGURE 1;

FIGURE 4 is a horizontal cross section taken on the line 4—4 of FIGURE 2;

FIGURE 5 is a plan view of the inside face of the prepared blank from which the carrier is formed, the view showing adhesive applied to certain areas of the blank preliminary to executing the first folding operations;

FIGURE 6 is a plan view showing the blank following the first folding and subsequent adhesive applying operations;

FIGURE 7 is a plan view showing the blank at a further stage in the folding thereof;

FIGURE 8 is a plan view of the completed carrier in the flat knocked down condition;

FIGURE 9 is a perspective view of a modified form of the article carrier in set-up, empty condition;

FIGURE 10 is a plan view of the inside face of the prepared blank from which the carrier of FIGURE 9 is formed, the view showing adhesive applied to certain areas of the blank preliminary to executing the first folding operations;

FIGURE 11 is a plan view showing the blank of FIGURE 10 following certain folding and adhesive applying operations;

FIGURE 12 is a plan view of the completed carrier of FIGURE 9 in flat, knocked down condition;

FIGURE 13 is a perspective view of a further form of the article carrier having embodied therein the principal features of the invention, the carrier being shown in set-up, empty condition with portions of a side wall and an adjoining end wall thereof broken away;

FIGURE 14 is a longitudinal vertical section taken on the line 14—14 of FIGURE 13;

FIGURE 15 is a transverse section taken on the line 15—15 of FIGURE 13;

FIGURE 16 is a horizontal cross section taken on the line 16—16 of FIGURE 13;

FIGURE 17 is a plan view of the inside face of the prepared blank from which the carrier of FIGURE 13 is formed, the view showing adhesive applied to certain areas of the blank preliminary to executing the first folding operations;

FIGURE 18 is a plan view showing the blank of FIGURE 17 following preliminary folding and subsequent adhesive applying operations;

FIGURE 19 is a plan view, with portions broken away, showing the blank of FIGURE 17 at a further stage in the folding thereof;

FIGURE 20 is a plan view of the completed carrier of FIGURE 13 in the flat knocked down condition;

FIGURE 21 is a perspective view of a still further modification of the article carrier, the carrier being shown in set-up, empty condition;

FIGURE 22 is a longitudinal vertical section taken on the line 22—22 of FIGURE 21;

FIGURE 23 is a transverse section taken on the line 23—23 of FIGURE 21;

FIGURE 24 is a horizontal cross section taken on the line 24—24 of FIGURE 22;

FIGURE 25 is a plan view of the inside face of the prepared blank from which the carrier of FIGURE 21 is formed, the view showing adhesive applied to certain areas of the blank preliminary to executing the first folding operations;

FIGURE 26 is a plan view showing the blank of FIGURE 25 following preliminary folding and subsequent adhesive applying operations;

FIGURE 27 is a plan view showing the blank of FIGURE 25 at a further stage in the folding thereof; and FIGURE 28 is a plan view of the completed carrier of FIGURE 21 in flat knocked down condition.

Referring first to FIGURES 1 to 8 of the drawings, there is illustrated one embodiment of the carrier which incorporates the principles of the invention. In the illustrated form, the carrier is fabricated from a flat blank 10 (FIGURE 5) of flexible paperboard sheet material which is of generally rectangular outline and which is relatively thin, for example, having a thickness of 0.020 inch, commonly referred to in the paperboard industry as 20 point stock. The blank 10 is cut and scored to divide the same into wall and partition forming panels which are thereafter folded and secured together to form the carrier of FIGURE 1. Since the cut and scored blank 10 is, to a large extent, symmetrical about the longitudinal and transverse center lines $a$—$a$ and $b$—$b$, respectively, corresponding elements which are found on opposite sides of the longitudinal center line $a$—$a$ will be designated by the same reference numerals and where an element found on one side of the transverse center line $b$—$b$ has a counterpart on the other side thereof, it will be designated by the same reference numeral primed.

The blank 10 is divided in the longitudinal direction thereof into three sections with the center section A and the two end sections B and B' being very nearly equal in size. The center section A is subdivided to provide a bottom and side walls for the carrier and the two end sections B and B' are subdivided to provide a combination partition and handle structure. The center blank section A is divided in the direction transversely of the blank 10 into a center or bottom wall forming panel 11 and two side wall forming panels 12. The bottom wall forming panel 11 is separated from the side wall forming panels 12 by a pair of parallel, longitudinally extending crease or score lines 13 which are spaced a predetermined distance apart, which distance is less than the overall width of the carrier in its set-up article receiving condition. The bottom wall panel 11 is subdivided into two parts or half panels by a longitudinal score line 14 which coincides with the center line $a$—$a$ of the blank and which permits folding of the bottom wall so that the carrier may be fabricated in collapsed condition. Each of the side wall forming panels 12 is separated from the end sections B and B' of the blank by transversely extending, parallel score lines 15 and 15' which form hinge lines for two pairs of blank sections C, C and C', C', the latter constituting the outside portions of the blank end sections B and B' or the four corner sections of the blank 10. The bottom wall forming panel 11 is separated from the center portions D and D' of the blank end sections B and B' by the cutting lines 16 and 16' which extend in the direction transversely of the blank between corresponding ends of the longitudinal score lines 13 and which are offset inwardly relative to the transverse score lines 15 and 15'.

The blank portions or sections D and D' are separated from the corner sections C and C' at one side of the blank by longitudinally extending and aligned cutting lines 17 and 17' which are parallel with and offset outwardly of the longitudinal score line 13 between the bottom wall panel and the side wall panel 12 at that side of the blank. At the other side of the blank the sections D and D' are partially separated from adjoining corner sections C and C' by longitudinally extending and aligned cutting lines 18 and 18' which are parallel with and extend in outwardly offset relation from the ends of the longitudinal score line 13 toward the ends of the blank. The blank sections D and D' remain attached to the corner sections C and C' along hinge forming perforated lines 19 and 19' which constitute outward extensions of the cutting lines 18 and 18' and which terminate short of the end edges of the blank. The blank sections D and D' are cut free of the terminal end portions of the adjoining corner sections C and C' along the longitudinal lines 20 and 20' which may also be parallel with the score line 13 and in approximate alignment therewith.

The four corner sections C, C and C', C' of the blank are subdivided into wall and partition forming panels in an identical manner by longitudinally spaced, parallel, transverse score lines 21, 22 and 21', 22'. They provide pairs of end wall forming panels 23 and 23', which adjoin the side wall panels 12, longitudinal partition forming panels 24 and 24' which are separated from the adjoining end wall panels 23 and 23' by the hinge forming score lines 21 and 21' and end panel members 25 and 25' which are separated from the adjoining longitudinal partition forming panels 24 and 24' by the hinge forming score lines 22 and 22' and which constitute one element of two part cross partition members in the set up form of the carrier. The end wall forming panels 23 and 23' and the longitudinal partition forming panels 24 and 24' are approximately the same size and have a dimension in the lengthwise direction of the blank which is approximately one-third the corresponding dimension of the side wall panels 12. The end panel members 25 and 25' have a dimension in the longitudinal direction of the blank which is no less than half the corresponding dimension of the adjoining longitudinal partition panels 24 and 24'.

Cross partition forming panel members 26 and 26' are cut from the end wall and longitudinal partition panels 23, 24 and 23', 24' in the corner sections C and C' of the blank. The cross partition members 26 and 26' are defined by pairs of generally U-shaped cutting lines which face toward opposite ends of the blank and which extend from the transverse crease lines 22 and 22' across the longitudinal partition panels 24 and 24' and a predetermined distance into the end wall panels 23 and 23' sufficient to form glue tabs 27 and 27' on the free ends of the members 26 and 26'. The members 26 and 26' are adapted to hinge about the portions 28 and 28' of the score lines 22 and 22' while the glue tabs 27 and 27' are adapted to hinge about the score lines 29 and 29' which are formed initially as portions of the transverse score lines 21 and 21'. The laterally spaced side edge forming lines which constitute the legs of each of the U-shaped cuts defining the cross partition members 26 and 26' extend in the longitudinal direction of the blank and are spaced inwardly of the lateral edges of the corner sections of the blank. These cutting lines have outwardly bowed portions so that the maximum transverse dimension of each of the cross partition members 26 and 26' is substantial, being somewhat less however than the corresponding dimension of the end panel members 25 and 25' against which these members are folded to form two ply or double thickness cross partitions, which, in the erected condition of the carrier, extend in transverse planes laterally of the longitudinal partition structure and are connected to the inside faces of the side walls 12 by securing the glue tabs 27 and 27' to the latter.

The longitudinal partition and handle forming sections D and D' at the opposite ends of the blank are subdivided by hinge forming transverse score lines 30 and 30' into longitudinal partition and handle forming panels 31, 32 and 31', 32'. These panels are of approximately the same dimension in the longitudinal direction of the blank in the handle forming areas thereof which are adjacent the cutting lines 17 and 17' while in the partition forming areas adjacent the cutting lines 18 and 18' the innermost panels 31 and 31' have a dimension in the longitudinal direction of the blank which is somewhat less than that of the outermost panels so that when the panels 31 and 31' are folded about the score lines 30 and 30' into face engagement with the panels 32 and 32', respectively, the handle forming marginal portions are in aligned superimposed relation and the panels 32 and 32' have marginal edge portions 33 and 33' which, in the set up condition of the carrier, are overlapped and secured together. Finger holes 34 and 34' are cut in the handle forming portions of the panels 31, 32 and 31', 32' which are spaced equal distances from the hinge lines 30 and 30' so that they are in alignment when the panels are folded upon each other and hinged reinforcing flaps 35 and 35' are provided in the finger holes.

The panels 31, 32 and 31', 32' are freed from the partition forming panels in the corner sections C and C' at the one side of the blank by the cutting lines 17 and 17' and from the wall forming panels in the center section A of the blank by the cutting lines 16 and 16'. At the other side of the blank the panels 31 and 31' are freed from the end wall panels 23 and 23' in the adjoining corner sections C and C' of the blank by the cutting lines 18 and 18' which permits the panels 31 and 31' to be folded about the hinge lines 30 and 30' onto the panels 32 and 32', respectively. The cutting lines 20 and 20' free the cross partition panel members 25 and 25' from the panels 32 and 32' so that the former may hinge about the score lines 22 and 22' when the carrier is set up. The panels 32 and 32' remain connected to the bottom forming edges of the longitudinal partition panels 24 and 24' on the hinge forming perforation lines 19 and 19' so that these panels may be folded into face engaging relation and secured together to form a longitudinal partition structure.

At one corner of the blank the cross partition member 25 is cut away at its inner end and a hook formation 36 is provided on the inner edge of the adjoining longitudinal partition forming panel 24 which is adapted to engage in a slot-like aperture 37 provided in the bottom wall panel 11 so as to anchor the latter to the longitudinal partition and hold the carrier in set up condition until the articles are placed therein.

The blank 10, when cut and scored, is glued and folded to provide the carrier which is illustrated in FIGURE 1. A suitable adhesive is initially applied to the cross partition panel members 26, 26' and the longitudinal partition panels 32, 32' as shown in FIGURE 5. The cross partition members 26' are folded outwardly about the hinge lines 28' into face engagement with the adjoining panel members 25' at the one end of the blank. At the other end of the blank the cross partition panel members 25 are folded inwardly about the score lines 22 into engagement with the adhesive coated portions of the cross partition members 26 and the tab members 27 are folded outwardly about the score lines 29 after which adhesive is applied to the exposed faces of the tabs 27 and 27' at both ends of the blank, as shown in FIGURE 6. The longitudinal partition panels 31 31' are also folded outwardly about the score lines 30 and 30' into engagement with the adhesive coated faces of the partition panels 32 and 32', respectively. The partition forming panels 24' and 25' in the corner sections C', C' of the blank are then folded inwardly about the score lines 21' into overlying relation with the side wall panels 12 and the end wall panels 23', bringing the adhesive coated faces of the tab members 27' into engagement with the respective side walls 12. The corner sections C, C are thereafter folded inwardly about the score lines 15 to bring the adhesive coated faces of the tab members 27 into engagement with the inside faces of the respective side wall panels 12. These folding operations bring the longitudinal partition and handle panels 31, 32 and 31', 32' into the position shown in FIGURE 7 where the marginal portions 33 and 33' of the panels 32 and 32' are overlapped and adhesively secured together. Thereafter, adhesive is applied to the exposed faces of the longitudinal partition panels 24, 24 and 24', 24'. Finally, the folded and connected longitudinal partition and handle panels 31, 32 and 31', 32' are swung about the hinges 19 and 19' to bring the panels 32 and 32' into engagement with the adhesive coated surfaces of the longitudinal partition panels 24 and 24' at one side of the bottom wall panel 11 and the assembly is folded about the center score line 14 to bring the adhesive coated faces of the other pair of longitudinal partition panels 24 and 24' into engagement with the exposed faces of the longitudinal partition panels 31 and 31'. This completes the gluing and folding operations and provides the carrier in knocked down condition as shown in FIGURE 8.

When opened up as shown in FIGURE 1, the carrier provides a multi-cellular carrier with two rows of three cells each on opposite sides of a center or longitudinal partition structure which has upstanding portions providing a handle or suspending means. The cross partition forming members 25, 26 and 25', 26' are secured in face-to-face engagement and each pair thereof is anchored to the inside face of a side wall by associated glue tab members 27 and 27' so as to provide rigid cross partitions each with a double thickness of the board material between the bottles or other articles which are placed in the cells. In the area of the longitudinal partition which extends between the two center cells, the panels 32 and 32' have overlapped marginal portions 33 and 33' which provide a double ply so that the articles in these cells are separated by two thicknesses of the board material. At the ends of the carrier the folded longitudinal partition panels 31, 32 and 31', 32' extend full depth between the end cells so as to cover the openings left in the longitudinal partition panels 24 and 24' by cutting the cross partition members 26 and 26' therein and folding the same out of the plane thereof whereby at least two thicknesses of the board material are provided between articles placed in the end cells. The carrier is designed so that the distance between the bottom score lines 13 forming the bottom hinges with the side walls is less than the combined width of the articles in the cells and some of the strain on the hinges is relieved by engagement of the bottom edges of the articles with the side walls above the hinges. Since the carrier employs a blank of rectangular shape and minimum size, substantial savings in material are achieved and when lightweight stock is employed a very economical or inexpensive carrier can be produced which has adequate strength and rigidity for single trip use and which satisfies the railway bottled beer shipping requirements as to the minimum stock separating the bottles in the cells.

A modified form of the carrier of FIGURE 1 is illustrated in FIGURES 9 to 12. In this form, the carrier is fabricated from a generally rectangular blank 50 which is cut and scored as shown in FIGURE 10. The blank 50, which is initially somewhat wider than the blank 10, is divided into wall and partition forming panels of a character similar to those found in the carrier of FIGURE 1 and also handle reinforcing and cover panels, the latter being taken from the additional material at one side of the blank resulting from the employment of the wider blank.

The blank 50 is generally symmetrical about longitudinal and transverse center lines aa—aa and bb—bb. It is divided in the longitudinal direction into three sections with the bottom and side wall forming center section AA and the two end sections BB and BB' in which the panels for the longitudinal cross partition structure are formed being of nearly equal dimension in the longitudinal direction of the blank. The center section AA is subdivided in the direction transversely of the blank into a bottom wall forming panel 51 and two side wall forming panels 52, on opposite sides of the bottom wall forming panel 52 and separated therefrom by parallel, laterally spaced, longitudinal score lines 53, the latter being spaced apart a distance which is less than the overall width of the carrier in its set up article receiving condition. The bottom wall panel 51 is further subdivided into two equal panel sections or parts by the longitudinal score line 54 which coincides with the longitudinal center line bb—bb of the blank so as to permit folding of the bottom wall. The two side wall panels 52 are separated from the end sections BB and BB' of the blank by transversely extending score lines 55 and 55' which form hinge lines for the corner blank sections CC and CC'. The bottom wall forming panel 51 is separated from the center portions DD and DD' by transversely extending cutting lines 56 and 56' which extend between the corresponding ends of the longitudinal score lines 53 and 53' and which are offset inwardly of the transverse score lines 55 and 55'.

The longitudinal partition and handle forming center portions DD and DD' of the blank end sections BB and BB' are separated from the blank corner portions or sections CC and CC' at one side of the blank by longitudinally extending and aligned cutting lines 57 and 57' which are parallel with and offset outwardly of the longitudinal score line 53 between the bottom wall panel 51 and the side wall panel 52 at that side of the blank. At the other side of the blank the sections DD and DD' are partially separated from the adjoining corner sections CC and CC' by aligned cutting lines 58 and 58' which are parallel with and extend in outwardly offset relation from the ends of the longitudinal score line 53 towards the ends of the blank. The blank sections DD and DD' remain attached to the corner sections CC and CC', respectively, along hinge forming perforated lines 59 and 59' which constitute outward extensions of the cutting lines 58 and 58' which terminate short of the end edges of the blank. These sections are cut free of the terminal end portions of the corner sections along the longitudinal lines 60 and 60', both of the latter being parallel with and offset inwardly of the blank relative to the perforated lines 59 and 59' from the outer ends of which they extend.

The four corner sections CC, CC and CC', CC' of the blank are subdivided in an identical manner by transversely extending, longitudinally spaced, parallel score lines 61, 62 and 61', 62' to provide pairs of end wall forming panels 63 and 63' which adjoin the side wall panels 52, longitudinal partition forming panels 64 and 64' which are separated from the adjoining end wall panels 63 and 63' by the hinge forming score lines 61 and 61', and end panel members 65 and 65' which are separated from the adjoining longitudinal partition forming panels 64 and 64' by the hinge forming score lines 62 and 62'. The last mentioned end panel members 65 and 65' constitute one element of two part cross partition members in the set up form of the carrier. The end wall forming panels 63 and 63' are all the same size. The longitudinal partition forming panels 64 and 64' have the same dimension in the longitudinal direction of the blank, while the end panel members 65 and 65' are of the same size with the dimension in the longitudinal direction of the blank being no less than one-half the corresponding dimension of the adjoining longitudinal partition forming panels 64 and 64'. Cross partition forming panel members 66 and 66' are cut from the longitudinal forming panels 64 and 64' in the blank corner sections CC and CC' on generally U-shaped cutting lines which face toward opposite ends of the blank and which extend from the transverse crease lines 62 and 62' across the longitudinal partition panels 64 and 64' and a predetermined distance into the end wall panels 63 and 63' sufficient to form glue tabs 67 and 67' on the free ends of the members 66 and 66'. The cross partition members 66 and 66' are adapted to hinge about center portions 68 and 68' of the score lines 62 and 62' while the glue tabs 67 and 67' are adapted to hinge about the score lines 69 and 69' which were formed initially as portions of the transverse score lines 61 and 61'. The cross partition members 66 and 66' and their associated glue tabs 67 and 67' correspond to members 26, 26' and 27, 27' in the form of the carrier shown in the blank of FIGURE 5.

The longitudinal partition and handle forming sections DD and DD' at the opposite ends of the blank are subdivided by hinge forming transverse score lines 70 and 70' into longitudinal partition and handle forming panels 71, 72 and 71', 72'. These panels are of the same dimensions in the transverse direction of the blank. In the longitudinal direction of the blank the panels 71 and 71' have a greater dimension than the corresponding dimension of the end wall panels 63 and 63', the transverse score lines 70 and 70' being aligned with the transverse score lines 61 and 61'. The panels 72 and 72' have a dimension in the longitudinal direction of the blank which corresponds to the combined dimension in the same direction of the adjoining sets of longitudinal and cross partition panels 64, 65 and 64', 65' in the blank corner sections CC and CC' so as to provide marginal portions 73 and 73' which are adapted to be overlapped in the set up condition of the carrier. The marginal portions along one side of the panels 71, 72 and 71', 72' adjacent the cutting lines 57 and 57' constitute handle forming portions which have hand hole forming openings 74 and 74' cut therein, the latter being in alignment when the panels 71 and 71' are folded about the score lines 70 and 70' into face engagement with the panels 72 and 72'.

The longitudinal partition forming panels 64 and 64' at the one side of the blank have integral laterally extending portions providing handle reinforcing members 76 and 76' which are identical with the handle forming marginal portions of the panels 72 and 72' and which are adapted to be brought into face-to-face aligned engagement with the same when the carrier is set up. A handle cover member 77 is provided along the same side of the blank and is adapted to hinge about a transverse score line 78 which constitutes an extension of the transverse secore line 61' and which separates the handle cover panel from the handle reinforcing panel 76' on the longitudinal partition panel 64'. The cover panel 77 is separated from the end wall panel 63' and the side wall panel 52 by a partly perforated, partly cut line 79 so that this panel may be readily broken loose and freed from the side wall panel 52 and the end wall panel 63' when the carrier is set up. The handle cover panel 77 is approximately the same dimension in the longitudinal direction of the blank as the side wall panels 52. A handle hole formation 80 is cut in the panel 77 and provided with a reinforcing tab or flap 81 which is adapted to hinge about the score line 82. The handle opening 80 is located so that it aligns with the openings 74 and 74' when the carrier is set up as shown in FIGURE 9.

The blank 50, when cut and scored as shown in FIGURE 10, is glued and folded to provide the carrier which is illustrated in FIGURE 9. The gluing and folding operations are substantially the same as the gluing and folding operations performed in assembling the carrier illustrated in FIGURE 1. As indicated in FIGURE 10, an adhesive is initially applied to the inside surfaces of the handle reinforcing panels 76 and 76' which extend from the longitudinal partition forming panels 64 and 64' so as to secure these members to the handle cover panel 77 when the longitudinal partition panels 64 and 64' are folded as shown in FIGURE 11. An adhesive is applied to the opposite or outside surfaces of the members 76 and 76', which are uppermost in the condition of the panel shown in FIGURE 11, in order to secure these panels to the handle forming sections of the panels 71, 72 and 71', 72'. The completed carrier, when opened up as shown in FIGURE 9, corresponds to the carrier shown in FIGURE 1, except for minor variations in cutting the partition panels and in the handle structure. The handle structures is reinforced by the additional panels 76 and 76' and the outer cover panel 77 which is located on the one side of the carrier so as to cover the handle portions of the panels 71, 72 and 71', 72' and which provides for a minimum of three plies of material throughout the length of the handle and also presents a finished appearance on both sides thereof.

The form of the carrier illustrated in FIGURES 13 to 20 is also similar to the carrier of FIGURE 1. It differs primarily in the arrangement of the cross partition members so as to eliminate the openings in the end wall panels which, when the carrier is used with certain products, may be considered objectionable due to the loss of advertising space on the end wall panels or for other reasons. This modification of the carrier is accomplished by eliminating the terminal glue tab on the cross partition panels and substituting therefor a cross partition strap which is taken from the upper corners of the side walls. The resultant carrier has the general appearance of the cross strap or high center cell type carrier.

The blank 100 from which this form of the carrier is fabricated is similar to the blank 10, being taken from relatively thin paperboard stock, and being of rectangular outline. It is cut and creased or scored to provide a plurality of wall and partition forming panels which, when folded and secured together in the proper manner, form the carrier of FIGURE 13. The blank 100 is generally symmetrical about longitudinal and transverse center lines c—c and d—d. It is divided in the longitudinal direction into three sections, with the bottom and side wall forming center section E and the two end sections F and F', in which the panels for the longitudinal and cross partition structure are formed, being very nearly equal is size. The center section E of the blank is subdivided in the direction transversely of the blank into a bottom wall forming panel 111 and two side wall forming panels 112 which are laterally spaced and on opposite sides of the bottom wall forming panel 111, being separated from the latter by longitudinal crease or score lines 113 about which the side wall panels hinge into upright position relative to the bottom wall panel 111 in the erected form of the carrier. Preferably, the score lines 113 are spaced apart a distance which is less than the overall width of the carrier in its set up article receiving condition. The bottom wall forming center panel 111 is divided into two parts by a longitudinally extending score line 114 which coincides with the longitudinal center line c—c of the blank and which permits folding of the bottom wall and fabrication of the carrier in collapsed condition. The side wall panels 112 are separated from the end sections F and F' of the blank by transversely extending score lines 115 and 115' which form hinge lines for the corner sections G and G' of the blank which constitute the outside portions of the blank end sections F and F'. The bottom wall forming panel 111 is separated from the center portions H and H' of the blank end sections F and F' by the cutting lines 116 and 116' which extend in the direction transversely of the blank between corresponding ends of the longitudinal score lines 113 and which are offset inwardly of the transverse score lines 115 and 115'.

The longitudinal partition and handle forming center portions H and H' of the end sections F and F' of the blank are separated from the corner portions or sections G and G' at one side of the blank by longitudinally extending and aligned cutting lines 117 and 117' which are parallel with and offset outwardly of the longitudinal score line 113 between the bottom wall panel 111 and the side wall panel 112 at that side of the blank. At the other side of the blank the blank sections H and H' are partially separated from the adjoining corner sections G and G' by longitudinally extending and aligned cutting lines 118 and 118' which are parallel with and extend in outwardly offset relation from the ends of the longitudinal score line 113 toward the ends of the blank. The blank sections H and H' remain attached to the corner sections G and G', respectively, along hinge forming perforated lines 119 and 119' which constitute outward extensions of the cutting lines 118 and 118' and which terminate short of the end edges of the blank. The blank sections H and H' are cut free of the terminal edge portions of the adjoining corner sections G and G' along the longitudinal lines 120 and 120', the former being parallel with and offset inwardly of the blank relative to the perforated line 119 and the latter being aligned with the cutting and perforating lines 118' and 119'.

The four corner sections G, G and G', G' of the blank are subdivided in an identical manner by transversely extending, longitudinally spaced, parallel score lines 121, 122 and 121', 122' to provide pairs of end wall forming panels 123 and 123' which adjoin the side wall panels 112, longitudinal partition forming panels 124 and 124' which are separated from the adjoining end wall panels 123 and 123' by the hinge forming score lines 121 and 121', and end panel members 125 and 125' which are separated from the adjoining longitudinal partition forming panels 124 and 124' by the hinge forming score lines 122 and 122' and which constitute one element of two part cross partition members in the set up form of the carrier. The end wall forming panels 123 and 123' and the longitudinal partition forming panels 124 and 124' are approximately the same size and have a dimension in the lengthwise direction of the blank which is approximately one-third the corresponding dimension of the side wall forming panels 112. The end panel members 125 and 125' have a dimension in the longitudinal direction of the blank which is no less than one-half the corresponding dimension of the adjoining longitudinal partition forming panels 124 and 124'.

Cross partition forming panel members 126 and 126' are cut from the longitudinal partition forming panels 124 and 124' in the blank corner sections G and G'. These members are formed by pairs of U-shaped cutting lines which face toward opposite ends of the blank and which extend from the transverse score lines 122 and 122' a predetermined distance into the panels 124 and 124'.

The flap-like cross partition members 126 and 126' have a dimension in the longitudinal direction of the blank which is no less than one-half the corresponding dimension of the longitudinal partition panels 124 and 124' from which they are taken. The side edge forming lines which constitute the legs of the U-shaped cuts are spaced inwardly of the lateral edges of the corner sections of the blank and are laterally spaced from each other so that the maximum transverse dimension of each of the cross partition forming members 126 and 126' is substantial, being somewhat less, however, than the corresponding dimension of the end panel members 125 and 125'. The cross partition members 126 and 126' are adapted to hinge about the portions 128 and 128' of the transverse score lines 122 and 122' into face engagement with the panel members 125 and 125' so as to form two ply or double thickness cross partitions, which, in the set up condition of the carrier, extend in transverse planes laterally of the longitudinal partition structure and are connected to the side walls 112 by means of relatively narrow connecting strap members 127 and 127', the latter being taken from the side wall forming panels 112.

The strap-like cross partition connecting members 127 and 127' are cut from the outside corners of the side wall forming panels 112 and have a dimension in the longitudinal direction of the blank which is approximately one-third the corresponding dimension of the side wall panels 112. These members are adapted to hinge about transversely extending score lines 129 and 129' into cross partition forming position and are connected to the respective cross partition forming panels 125 and 125'.

The longitudinal partition and handle forming sections H and H' of the blank are subdivided by hinge forming, transversely extending score lines 130 and 130' into foldable panels 131, 132 and 131', 132'. The transverse score lines 130 and 130' are aligned with the transverse score lines 121 and 121' so that the inner panels 131 and 131' have a dimension which is slightly greater than the corresponding dimension of the adjacent end wall panels 123, 123 and 123', 123' and the outer panels 132 and 132' have a dimension in the same direction which is the same as the corresponding dimension of the partition forming panels 124, 125 and 124', 125' on each side thereof, which dimension exceeds one-half the length of the carrier when the latter is set up, so as to provide for overlapping of the outer marginal portions 133 and 133' of the panels 132 and 132'. The transverse dimension of each of the panels 131, 132, 131', 132' is greater than the corresponding dimension of the end wall and longitudinal partition forming panels in the corner sections G and G' of the blank so that, in the set up condition of the carrier, the top marginal portions of these panels project above the side wall and cross partition structure a sufficient distance to provide a handle formation for suspending the carrier. The panels 131, 132 and 131', 132' are provided with finger holes 134, 135, 136 and 134', 135', 136' which are spaced relative to the score lines 130 and 130' so as to align with each other when the panels are folded and hinged reinforcing flaps 137 and 137' are provided in the finger holes 135 and 135'.

The blank 100, when cut and scored, is glued and folded to provide the carrier which is illustrated in FIGURE 13. A suitable adhesive is initially applied to the partition forming members 126 and 126' and the longitudinal partition panels 132 and 132' as shown in FIGURE 17. The cross partition members 126', 126' are folded outwardly about the hinge lines 128', 128' into face-to-face engagement with the adjoining panel members 125', 125' at the one end of the blank. At the other end of the blank the cross partition forming panel members 125, 125 are folded inwardly about the score lines 122, 122 into engagement with the adhesive coated inner faces of the cross partition members 126, 126. The longitudinal partition panels 131 and 131' are also folded outwardly about the score lines 130 and 130' into engagement with the adhesive coated faces of the partition panels 132 and 132', respectively. The cross partition connecting straps 127, 127 are folded 180° about the score lines 129, 129 and an adhesive is applied to the connecting straps 127, 127 and 127', 127' as indicated in FIGURE 18. The partition forming panels 124' and 125' in the corner sections G', G' of the blank are folded inwardly about the score lines 121' into overlying relation with the side wall panels 112 and the adjoining end wall panels 123', bringing the marginal portions of the cross partition panels 125' at the top forming edge thereof into engagement with the adhesive coated portions of the connecting strap members 127'. The corner sections G, G are thereafter folded inwardly about the score lines 115, 115' bringing the marginal portions of the cross partition panels 125 at the top forming edges thereof into engagement with the adhesive coated portions of the connecting strap members 127. These folding operations bring the previously folded longitudinal partition and handle forming panels 131, 132 and 131', 132' into the position shown in FIGURE 19 where the marginal portions 133 and 133' of the panels 132 and 132' are overlapped and adhesively secured together. Thereafter, adhesive is applied to the exposed faces of both sets of longitudinal partition panels 124, 124'. Finally, the folded and connected longitudinal partition and handle panels 131, 132 and 131', 132' are swung about the hinges 119 and 119' to bring the panels 132 and 132' into engagement with the adhesive coated surfaces of the longitudinal partition panels 124 and 124' at one side of the bottom wall panel 111 and finally the assembly is folded about the center score line 114 to bring the adhesive coated faces of the other pair of longitudinal partition panels 124, 124' into engagement with the exposed faces of the longitudinal partition panels 131 and 131'. This completes the gluing and folding operations and provides a carrier in knocked-down condition as shown in FIGURE 16.

When opened up as shown in FIGURE 9, the assembly provides a multi-cellular carrier with two rows of three cells each on opposite sides of a center longitudinal partition structure which has upwardly extending marginal portions providing a handle or suspending means. The cross partition forming members 125, 126 and 125', 126' of each set thereof are secured in face-to-face engagement and the cross partitions are anchored to the inside faces of the side walls by the cross strap or connecting flap members 127 and 127', thereby providing, in set up condition, rigid cross partitions each with a double thickness of the board material between the bottles or other articles which are placed in the cells. In the area of the longitudinal partition which extends between the two center cells the panels 132 and 132' have overlapped marginal portions 133 and 133' which provide a double ply so that the articles in these cells are separated by two thicknesses of the board material. At the ends of the carrier the folded longitudinal partition panels 131, 132 and 131', 132' extend full depth between the end cells so as to cover the openings left in the longitudinal partition panels 124, 124' by cutting the cross partition members 126 and 126' therein and folding the same out of the plane thereof whereby at least two thicknesses of the board material are provided between the articles placed in the end cells. In this form of the carrier the bottom wall forming panel 111 is made of a width which is less than the overall width of the carrier so that the distance between the bottom score lines 113 forming the bottom hinges of the side walls is less than the combined width of the articles in the cells and some of the strain on the hinges is relieved by engagement of the bottom edges of the articles with the side walls above the hinges.

Another form of the carrier is illustrated in FIGURES 21 to 24 which is similar to the form shown in FIGURE 13, differing from the latter primarily in the provision for a greatly reinforced longitudinal partition and handle structure.

This form of the carrier is fabricated from a generally rectangular paperboard blank 150 which is cut and creased as shown in FIGURE 25. The blank is divided in a transverse direction into a bottom and longitudinal partition forming center section K, and two side sections L and L', the latter being subdivided into wall and partition forming panel elements by substantially identical creasing and cutting lines so that these sections of the blank are substantially symmetrical about a longitudinally extending center line e—e and in the interest of brevity only one of these side sections will be described, corresponding parts of the same relation on the opposite side of the center line *e—e* will be indicated by the same numerals primed.

The center portion of the center section K of the blank 150 constitutes a bottom wall forming panel 151 which is separated from side wall panels 152 and 152' in the blank side sections L and L' by parallel, longitudinally extending, laterally spaced crease lines 153 and 153'. The bottom wall panel 151 is subdivided by a center crease line 154 which coincides with the longitudinal center line *e—e* of the blank. The bottom wall panel section 151 is separated from the two end portions M and M' of the center blank section K by parallel, transversely extending, longitudinally spaced cutting lines 155 and 155'. The blank portions M and M' are separated from the one side section of the blank by the longitudinally aligned cutting lines 156 and 157 which extend from the ends of the score line 153 to the opposite end edges of the blank. The blank portions M and M' are separated from the other side section L' by the longitudinally aligned cutting lines 156' and 157' which are parallel to the cutting lines 156 and 157, respectively, and which extend from the ends of the longitudinal score line 153' in the direction of the end edges of the blank. The blank sections M and M' remain attached to the side section L' on the hinge forming perforated lines 158 and 159 which extend from the cutting lines 157' and at their outer ends the blank sections M and M' are freed from the blank side section L' on the cutting lines 160 and 161, both of which are offset inwardly relative to the adjoining hinge lines 158 and 159.

Since the two blank side sections L and L' are subdivided by substantially identical creasing and cutting lines so that these blank sections are substantially symmetrical about the longitudinal center line *e—e*, only one of these side sections will be described and corresponding parts of the same relation on the opposite side of the center line *e—e* will be indicated by the same numerals primed.

The side section L is creased or scored on parallel, longitudinally spaced lines 162 and 163 to divide the center side wall forming panel 152 from the adjoining corner forming portions of the blank and the latter are in turn scored on longitudinally spaced, transverse lines 165 and 166 to define, with the transverse score lines 162 and 163, end wall forming panels 167 and 168. The remaining portions of the blank section L are subdivided by transverse score lines 169 and 170 into longitudinal partition forming panels 171 and 172 and cross partition panel members 173 and 174, the latter being at the outer end margins of the blank section. Identical flap-like cross partition forming panel members 175 and 176 are cut in longitudinal partition panels 171 and 172 which are adapted to hinge into face engagement with the panel members 173 and 174 about portions 177 and 178 of the transverse score lines 169 and 170, respectively. The panel members 173, 175 and 174, 176 have a width, or a dimension in the longitudinal direction of the blank, which is no less than one-half the corresponding dimension of the end wall forming panels 167 and 168, the latter being approximately one-third the length of the side wall panel 152. The one longitudinal partition panel 171 has an extended outer end portion 179 which terminates short of the outer side edge of the blank and is adapted to be trapped between panel elements of the handle structure when the carrier is set up. The other longitudinal partition panel 172 has an extended outer end portion 180 which is also adapted to be trapped between panel elements of the handle structure when the carrier is set up. The cross partition forming panel member 174 in this portion of the blank is cut free of the panel portion 180 on the longitudinal cutting line 181 so that it is free to hinge about the transverse score line 170 out of the plane of the panel 172.

A center divider or longitudinal partition and handle forming section 182 extends between the crease lines 165 and 166 and outwardly in the direction of the side edge of the blank from the side wall forming panel 152. This partition and handle forming section 182 is hingedly connected to the extended end portion 180 of the one longitudinal partition panel 172 by an extended end portion 183 of the transverse crease line 166. The section 182 is freed from the end wall forming panels 167 and 168 by diagonal cutting lines 184 and 185 and from the side wall panel 152 by the longitudinally extending cutting line 186 which extends between outer hinge forming sections 187 and 188 of the transverse crease lines 162 and 163, respectively. The crease lines 187 and 188 form the inner hinges for relatively narrow cross partition forming straps 190 and 191 which are cut from the corners of the side wall panel 152 on the longitudinally extending cutting lines 192 and 193, the latter terminating short of the longitudinal center of the panel and extending parallel with the end portions of the cutting line 186. Transversely extending crease lines 194 and 195 extend between the spaced inner ends of the cutting lines 192 and 193 and the cutting line 186 to form the outer hinges of the cross partition straps 190 and 191, which straps extend, in the set-up position of the carrier, between the side wall 152 and the longitudinal partition and handle structure.

The longitudinal partition and handle forming section 182 of the blank is subdivided by a transversely extending crease line 196, which is aligned with the transverse crease line 184, into outer and inner handle panel members 197 and 198. Hand holes 199 and 200 are cut in the panels 197 and 198 with the hand hole 199 having a hinged locking flap 201. A hand hole 202 is also cut in the extension panel 180. A relatively narrow flap 203 extends laterally of the handle panel 197 and is hinged thereto along the longitudinally extending crease line 204.

The longitudinal partition and handle reinforcing blank sections or portions M and M' are subdivided by transverse score or crease lines 205 and 205' into two hingedly connected panels 206, 207 and 206', 207' with these panels having the same dimensions transversely of the blank. The panels 206 and 206' have a dimension longitudinally of the blank approximately equal to the corresponding dimension of the panels 171 and 172 while the panels 207 and 207' have a greater dimension in the same direction so as to provide for overlapping of the marginal end portions 208 and 208' thereof when the carrier is assembled.

The blank 150, when cut and scored, as shown, is glued and folded to provide the carrier of FIGURE 21. A suitable adhesive is initially applied to certain of the panels as indicated in FIGURE 25 and the blank is folded following the same sequence of operations as described with reference to the blank 100 and as indicated in FIGURES 26 and 27, resulting in the collapsed carrier shown in FIGURE 28.

When the carrier of FIGURE 21 is set up, the cellular structure is substantially the same as in the carrier of FIGURE 13. Double plies of the blank material are provided between the article in each cell and the articles in the adjoining cells. In addition, a strong and rigid handle structure is provided with multiple thicknesses of material throughout and with both faces covered in an attractive manner.

While paritcular materials and specific details of construction have been referred to in describing the several forms of the carrier which are disclosed, it will be understood that other materials and different details of construction may be resorted to within the spirit of the invention.

I claim:

An article carrier comprising in the completed and erected condition thereof, a bottom wall panel, a pair of upstanding side wall panels, a pair of end wall panels connected along upright corner forming hinge lines at each end of the carrier to corresponding ends of the side wall panels and extending in end wall forming relation between the same, an upright longitudinal partition structure connected at its opposite ends on upright hinge lines to the adjacent inner edges of the pairs of end wall panels, said longitudinal partition structure comprising pairs of longitudinal partition panels at each end thereof which are connected in oppositely disposed relation and integrally hinged to the adjacent inner edges of a pair of end wall panels, a cross partition panel member hinged to the inner vertical edge of each of said longitudinal partition panels and disposed in parallel transverse planes which are spaced equal distances from each other and from adjacent end wall panels, a second cross partition panel member cut from each of said longitudinal partition panels in an area spaced from the top and bottom edges thereof, said cross partition panel members having a width no less than half the width of said longitudinal partition panels and said second cross partition panel member being hinged about the inner edge of the adjoining cross partition panel member into face engaging relation with the latter, a cross strap member connected to each of said first named cross partition panel members and integrally hinged to a side wall panel, and said longitudinal partition structure including pairs of longitudinal partition and handle panels folded upon each other and trapped between said oppositely disposed longitudinal partition panels at each end of the longitudinal partition structure with an inner marginal portion of one of the panels of each pair thereof overlapping and secured to an inner marginal portion of one of the panels of the other pair thereof.

References Cited in the file of this patent

UNITED STATES PATENTS

| | | |
|---|---|---|
| 2,598,920 | Keith | June 3, 1952 |
| 2,772,810 | Arneson | Dec. 4, 1956 |
| 2,846,114 | Ringler | Aug. 5, 1958 |
| 2,893,593 | Toensmeier | July 7, 1959 |
| 2,957,602 | Ryder | Oct. 25, 1960 |